(12) United States Patent
Chu

(10) Patent No.: US 6,427,146 B1
(45) Date of Patent: Jul. 30, 2002

(54) DATABASE EVENT DETECTION AND NOTIFICATION SYSTEM USING TYPE ABSTRACTION HIERARCHY (TAH)

(76) Inventor: Wesley W. Chu, 16794 Charmel La., Pacific Palisades, CA (US) 90272

( * ) Notice: Subject to any disclaimer, the term of this patent is extended or adjusted under 35 U.S.C. 154(b) by 0 days.

(21) Appl. No.: 09/539,799

(22) Filed: Mar. 31, 2000

(51) Int. Cl.[7] .............................................. G06F 17/30
(52) U.S. Cl. ......................... 707/3; 707/102; 707/100; 706/11; 706/12; 714/5
(58) Field of Search .......................... 707/3, 102, 103; 706/50, 45, 11, 46, 47, 12, 59, 60, 61, 15, 16, 102, 502; 700/83, 17; 714/26, 39; 717/2, 5

(56) References Cited

U.S. PATENT DOCUMENTS

| | | | | |
|---|---|---|---|---|
| 5,408,662 A | * | 4/1995 | Katsurabayashi | 709/101 |
| 5,410,475 A | * | 4/1995 | Lu et al. | 704/1 |
| 5,655,081 A | * | 8/1997 | Bonnell et al. | 709/202 |
| 5,748,884 A | * | 5/1998 | Royce et al. | 395/185.1 |
| 5,828,882 A | * | 10/1998 | Hinckley | 709/300 |
| 6,006,016 A | * | 12/1999 | Faigon et al. | 395/185.01 |
| 6,021,403 A | * | 2/2000 | Horvitz et al. | 706/45 |
| 6,029,144 A | * | 2/2000 | Barrett et al. | 705/30 |
| 6,233,570 B1 | * | 5/2001 | Horvitz et al. | 706/11 |

* cited by examiner

Primary Examiner—Jean M. Corrielus
(74) Attorney, Agent, or Firm—Arter & Hadden LLP

(57) ABSTRACT

A database event detection and notification system includes a rule definer for defining a high level rule which can include conceptual terms (e.g. bad, heavy) and as cooperative operators (e.g. approximate, similar-to, near-to). A rule converter converts the high level rule into a low level rule in which the conceptual terms and cooperative operators are quantified. An event manager detects and evaluates an event generated by the database or a Local Event Detector (LED). A rule manager applies the low level rule to the event detected by the event manager, and an action manager performs an action in accordance with the application of the rule by the rule manager. The action can include notifying a specified person or program that the event has occurred. The rule converter and the action manager utilize a Type Abstraction Hierarchy (TAH) for converting the high level rule into the low level rule and performing the action respectively. The rule comprises an attribute. The TAH comprises leaves corresponding to instances of the attribute, and a hierarchical arrangement of nodes which specify ranges that include at least one of the instances respectively. The rule converter and the action manager are configured to convert the high level rule into the low level rule and perform the action by relaxing a value of the attribute in accordance with the TAH. An existing rule can be modified or a new rule inserted into the system without shutting down the system and recompiling all the rules.

10 Claims, 7 Drawing Sheets

DATABASE EVENT DETECTION AND NOTIFICATION SYSTEM USING TYPE ABSTRACTION HIERARCHY (TAH)

CROSS-REFERENCE TO RELATED APPLICATION

This application is related to U.S. patent application Ser. No. 08/800,035, entitled "DATABASE SYSTEM WITH QUERY RELAXATION USING TYPE ABSTRACTION HIERARCHY (TAH) AS QUERY CONDITION RELAXATION STRUCTURE", filed Feb. 13, 1997, by Wesley W. Chu, now U.S. Pat. No. 5,956,707, issued Sep. 21, 1999. The contents of this related application are incorporated herein by reference in their entirety.

BACKGROUND OF THE INVENTION

1. Field of the Invention

The present invention generally relates to the management of database generated events, and more specifically to a database event detection and notification system using a Type Abstraction Hierarchy (TAH).

2. Description of the Related Art

The retrieval and display of critical and timely data is essential in modern information systems. Database triggering is one approach to achieve this goal. It is applicable to complex, dynamic databases that require advanced information management capabilities to identify and act on changes in critical data. Such systems have a wide range of usage in both military (e.g. logistic planning, crisis management, etc.) and commercial users (e.g., fraud detection, inventory control, logistics planning, risk management, health care information system, etc.).

The trigger mechanisms in commercial relational database systems (RDBMS) such as Oracle, Sybase, etc. process active Event-Condition-Action (ECA) rules on low-level events, such as insert, update, delete, etc. Further, these mechanisms are based on exact trigger conditions and actions.

However, real world trigger conditions and actions are often inexact, uncertain, user and context sensitive, and are represented by concepts. For this reason, database triggering has been limited to simple applications in which the triggering rules can be entered exactly. A system for specifying conceptual event triggering and notification rules to a database system has not heretofore been proposed.

SUMMARY OF THE INVENTION

To handle inexact and uncertain conditions, the present invention provides a new active database technology that the inventor has named the "Cooperative Sentinel (CoSent) System", which supports active rules with conceptual terms (e.g. heavy, large) and approximate operators (e.g. similar-to, near-by). As a result, it is much easier for rule specification and maintenance. Further, CoSent also supports distributed composite events.

More specifically, the CoSent system is a database event detection and notification system which includes a rule definer for defining a high level rule which can include a conceptual term such as a cooperative operator (e.g. approximate, similar-to, near-to). A rule converter converts the high level rule into a low level rule in which the conceptual term is quantified.

An event manager detects and evaluates an event generated by the database or a Local Event Detector (LED). A rule manager applies the low level rule to the event detected by the event manager, and an action manager performs an action in accordance with the application of the rule by the rule manager. The action can include notifying a specified person or program that the event has occurred.

The rule converter and the action manager utilize a Type Abstraction Hierarchy (TAH) for converting the high level rule into the low level rule and performing the action respectively. The rule comprises events, conditions and actions which can be described by the attributes. The TAH comprises leaves corresponding to instances of the attribute, and a hierarchical arrangement of nodes which specify ranges that include at least one of the instances respectively.

As shown in FIG. 9, the rule converter consists of a rule decomposer 90, rule definition macro 88, and a rule translator 92. The rule decomposer 90 based on the user type, context and rule definition converts the high level (English-like) rule into a set of specific low level rule(s). The rule translator 92 based on the specific TAHs translates the conceptual terms and approximate terms in the rule into value ranges.

These and other features and advantages of the present invention will be apparent to those skilled in the art from the following detailed description, taken together with the accompanying drawings, in which like reference numerals refer to like parts.

DETAILED DESCRIPTION OF THE INVENTION

To process inexact and uncertain database trigger conditions which cannot be handled by the prior art, the present invention provides a new active database technology called the Cooperative Sentinel (CoSent) system that supports active rules with conceptual terms (e.g. heavy, large) and approximate operators (e.g. similar-to, near-by). Further, CoSent supports distributed composite events. As a result, it is much easier to perform rule specification and maintenance than with the prior art.

CoSent is able to monitor temporal composite events where the trigger conditions and actions can be specified in English-like rules. Such rules mimic the human cognitive process, which not only increases the expressability but also greatly eases rule specification for the user.

Further, such high level rules reduce the number of rules in the system and thus ease in rule maintenance. CoSent uses domain knowledge in the form of Type Abstraction Hierarchies (TAH) to translate the conceptual terms and approximate operators into range values and input to the triggering mechanism of the commercial RDBMSs. Therefore, users do not have to modify their databases.

CoSent can detect temporal composite event changes that satisfy certain specific conditions. The changes can be specified in an English-like Event-Condition-Action (ECA) rule, which contains conceptual terms and approximate operators. CoSent can be used by advanced logistics for the monitoring of dynamically changing critical composite events, terms and trends that store data on commercial relational databases.

Figure 1:
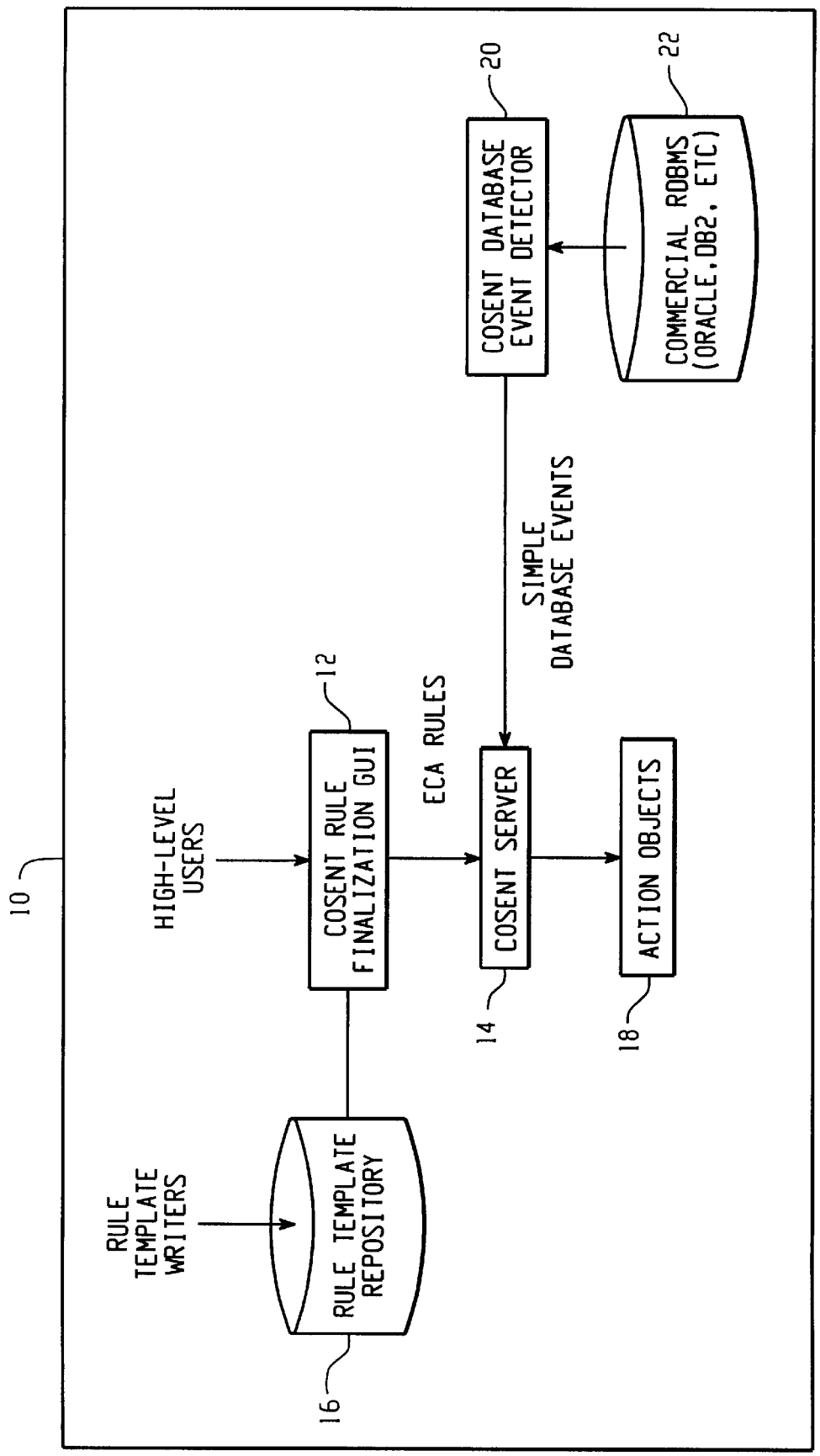
FIG. 1 is a diagram illustrating a database event detection and notification system according to the present invention.

As illustrated in FIG. 1, a CoSent system 10 according to the present invention comprises a Graphical User Interface (GUI) 12 which functions as a rule definer to assist high-level users in rule specification, and a CoSent server 14. Rules are written in an English-like language which can include conceptual terms in the form of cooperative and approximate operators. Rules can be written in the form of templates and stored in a rule template repository 16. The templates in the repository 16 are read into the GUI 12 such that the user can assign quantitative values to the conceptual terms in the rule templates and thereby convert the high level rule into a low level rule.

The system 10 further comprises a set 18 of Cosent action objects. A Cosent simple database event detector 20 detects events which are specified by the rules and generated by a commercial RDBMS database 22 such as ORACLE, SYBASE, DB2, etc.).

Figure 2:
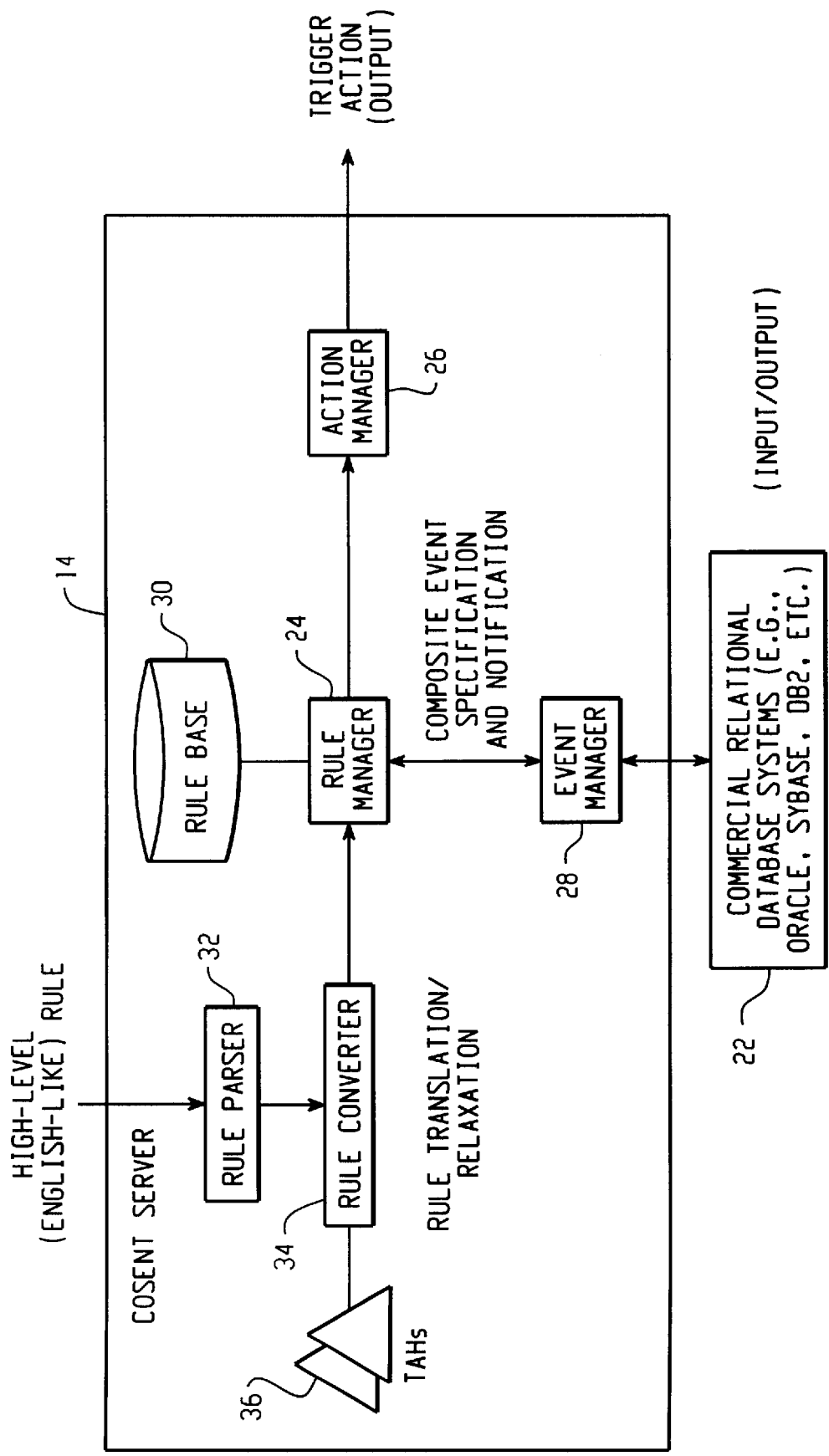
FIG. 2 is a simplified block diagram of a server of the present system.

The Cosent server 14 is illustrated in FIG. 2 and comprises a rule manager 24, an action manager 26 and an event manager 28 to help monitor composite database events that are inputted from simple database events. Rules in the English-like language are stored in a rule base 30 for access and conversion into low level rules by the rule manager 24. The converted low level rules are stored in the database 22 as will be described in detail below. The server 14 further comprises a rule parser 32, a rule converter 34 and a store of Type Abstraction Hierarchies (TAHs) 36 which will also be described in detail below.

An event generated by the database 22 is evaluated by the event manager 28 and the rule manager 24 in accordance with the stored rules. If it is the subject of a simple rule, the action manager 26 performs an action in accordance with the application of the rule. The action can be notifying a designated party by e-mail or the like that the event has occurred.

If the event is more complex, the event manager 28 passes the action to the rule manager 24 which evaluates the event and rule and controls the action manager 26 to perform a corresponding action.

With the CoSent layer architecture, primitive event detection is done at the database site, rule evaluation is done at the CoSent Server, and the rule action execution is evaluated at the Action Server. As a result, CoSent provides autonomous and detached condition evaluation and autonomous and detached action execution. Because of the separation of the CoSent Server from Action Server, rules with new action can be added without interfering with event detection. Therefore CoSent rules can be constructed during run time even with a new action specification. An existing rule can be modified or a new rule inserted into the system without shutting down the system and recompiling all the rules.

Figure 3:
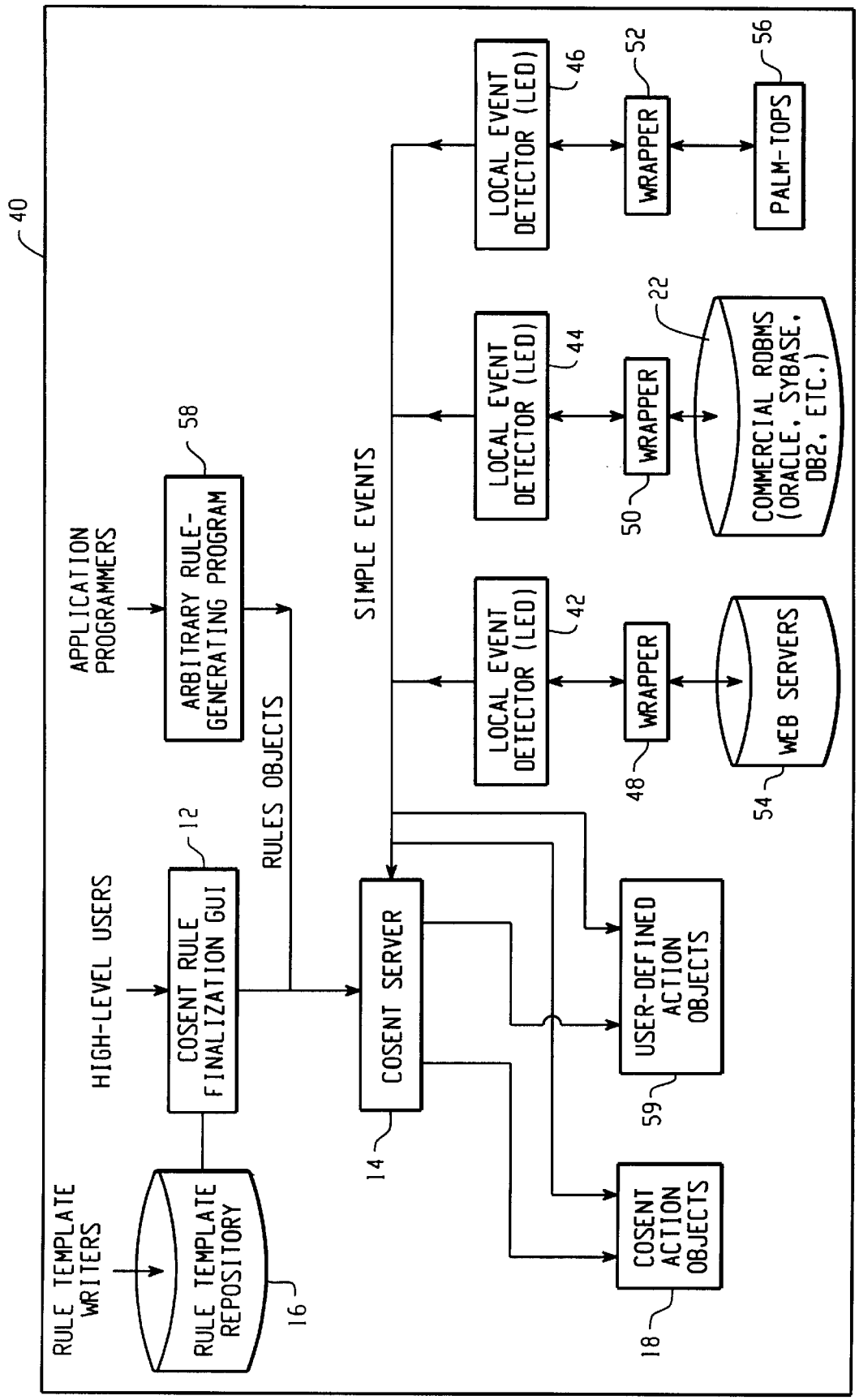
FIG. 3 is a block diagram of an distributed system according to the invention.

FIG. 3 illustrates a distributed CoSent system (d-CoSent) 40 which comprises a set of Local Event Detectors (LED) 42, 44 and 46. The LEDs reside at distributed hosts and interface with event sources using alert mechanisms provided by distributed object interconnection middleware wrappers 48, 50 and 52 (e.g. JINI). As shown, the LED 42 detects events from web servers 54 which can be remotely distributed over the World Wide Web.

The LED 44 generally corresponds to the LED 20 as shown in FIG. 1 and detects events from the database 22, and the LED 46 detects events from a discrete device such as a palm-top computer 56. Further illustrated is an arbitrary rule generating program 58 which enables application programmers to generate rule objects. Further illustrated are the set 18 of Cosent action objects 18 and a set 59 of user-defined action objects which are generated by the program 58.

An LED is able to make an evaluation on local event conditions specified by the user. After a simple event is detected, if it satisfies the local rule conditions in the LED, then the LED directly notifies the action manager 26 in accordance with the CoSent action objects 18 or user-defined action objects 59. If a simple event is involved with the composite event, then the LED notifies the CoSent server 14.

d-CoSent provides a uniform interface for users and application programmers to specify triggering rules for distributed and heterogeneous event sources. The wrappers 48, 50 and 52 of the event sources hide the heterogeneity of event sources. The LEDs, CoSent Server 14 and action objects 18 and 59 interact through the distributed object interconnection middleware wrappers 48, 50 and 52. Therefore, distributed CoSent can be used in for monitoring dynamic, distributed, time critical events, items, or trends from a variety of data sources such as palm computers, pagers, sensors, Web documents, etc.

Event-Condition-Action (ECA) rules are commonly used in active databases. Current commercial databases (e.g., Oracle and Sybase) only support triggering on low-level events such as insert, update, delete, etc., and therefore are not adequate for many applications such as logistic planning, crisis management, early fault detection, etc. Although some prototype object-oriented databases can support composite events, they do not support ECA rules with conceptual and approximate terms.

Further, these systems do not interface with triggering systems in commonly used relational databases. Cosent can support English-like ECA rules with conceptual and approximate operators acting on composite events. The concepts of rules with conceptual terms, rules with cooperative operators, and the CoSent architecture will be described in detail below.

Rules With Conceptual Terms

Consider the Following Rule

R1: If wind_speed>40 mph and wave height>5 ft, then notify commanders.

R1 is a precise rule, which uses exact values to represent the triggering condition. Thus, the rule designers need to have detailed knowledge of the schema to specify the weather conditions and notify the commanders. Further, wind speed is not a precise concept. To remedy these shortcomings, the present invention enhances rule expressability by allowing conceptual terms in rules. As a result, R1 can be rewritten as:

R1': If the weather is bad, then notify commanders.

In this high level (English-like) rule, "bad weather" is a conceptual term. Based on the application context and domain knowledge, "bad" weather can be transformed into a range condition (e.g., wind_speed>40 mph and wave_height>5 ft). The domain knowledge can be represented by Type Abstraction Hierarchies (TAHs) 36 (FIGS. 7 and 8) as described in the above referenced patent and can be automatically generated from the databases.

Figure 4:
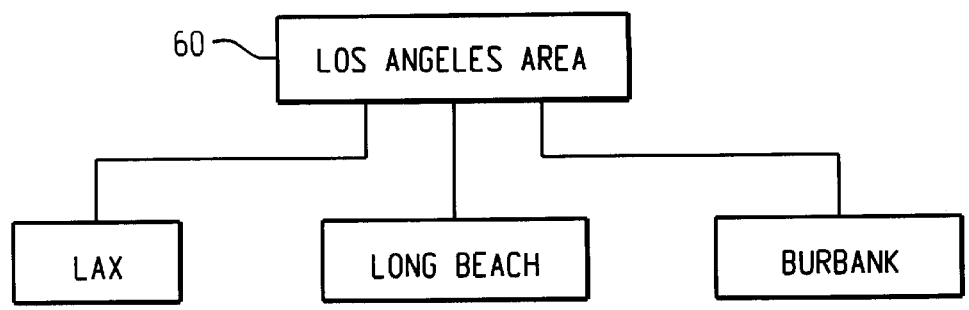
FIG. 4 is a view illustrating a simple Type Abstraction Hierarchy (TAH)

FIG. 4 illustrates a TAH 60 for the Los Angeles area. Using English-like active rules also reduces the number of rules in the system. The cooperative sentinel facility can derive specific low-level rules from high-level rules by relaxing the conditions in the corresponding TAHs 36. For example, based on the TAH for Los Angeles Area Airports, the following high level rule:

R2: Notify the user if a flight from Los Angeles Area to New York is inserted into the database.

can be rewritten as the following set of low level, specific rules:

R21: Notify the user if a flight from LAX to New York is inserted into database.

R22: Notify the user if a flight from Burbank to New York is inserted into the database.

R23: Notify the user if a flight from Long Beach to New York is inserted into the database.

Likewise, based on the TAHs corresponding to the user type and context, a set of ECA rules can be generalized into English-like rules.

Rules With Cooperative Operators

To enhance the expressive power of rules, the present invention introduces cooperative operators such as approximate, similar-to, and near-to to specify the rule conditions. For example:

R3: If the weather turns bad, then notify all units in that region. can be rewritten as R3' if cooperative operators are used:

R3': If the weather turns bad, notify all units in and near-to that region.

Consider the following rule from logistic planning:

R4: If the aircraft has a fuel contamination problem and the aircraft type is similar-to a 'C-5' based on its fuel type and fueling method, then notify the commanders.

Note that in R4 the term "similar-to" is a cooperative operator that covers a class of rules for different types of aircraft that have similar contamination problems as C5 based on the fuel types and fueling method. Thus, it greatly increases the expressive power of the rule.

To process this rule, the rule converter 34 translates the "similar-to" operator based on R4 to a set of exact conditions (e.g., fueling by similar design trucks from the same company instead of fuel hydrant on the airlift parking ramp). This information can be obtained from the Maintenance Database.

For example, if fuel contamination events occur, then the rule will search the maintenance database and locate all aircraft that have similar fueling methods to check for fuel filter problem.

Rule Installation Via Rule Template Construction and Rule Finalization

The domain experts who are knowledgeable in specifying rule conditions that cause triggers may not be skilled in using the SQL-like CoSent rule syntax. Therefore, the present invention installs rules via the rule templates in the repository 16 and the rule finalization GUI 12. Therefore, there are two types of users: rule template writers and high-level users. Rule template writers are responsible for generating rule templates that represent typical responses to certain situations, leaving parameter values unspecified during the construction of rule templates. Rule template writers are familiar with the language syntax and generate the templates after consultation with the high-level users who are familiar with the domain.

The rule templates written by the rule template writers are stored in the rule template repository 16. Such rule templates contain undetermined domain specific parameters, including cooperative features such as conceptual terms. Based on the domain knowledge, the end user specifies the rule template parameter values, conceptual terms, and the relaxation scope of cooperative operators using the GUI 12.

This process completes the rule installation for the high-end user. The process of converting rule templates into usable rules by filling in parameter values is called rule finalization.

For example, if the rule template writer has written a template RT1:

RT1: If the weather is WEATHER_CONDITION_X nearby LOCATION_Y, then notify commander COMMANDER_Z.

To install this rule template into the system, the GUI 12, which is a rule finalization interface (integrated with user interface components like GUI, Map interface, etc.) will be popped up for high-level users to fill in the parameters 'WEATHER_CONDITION_X', 'LOCATION_Y', and 'COMMANDER_Z' and explicitly select the relaxation scope for cooperative operator 'nearby'.

Figure 5:
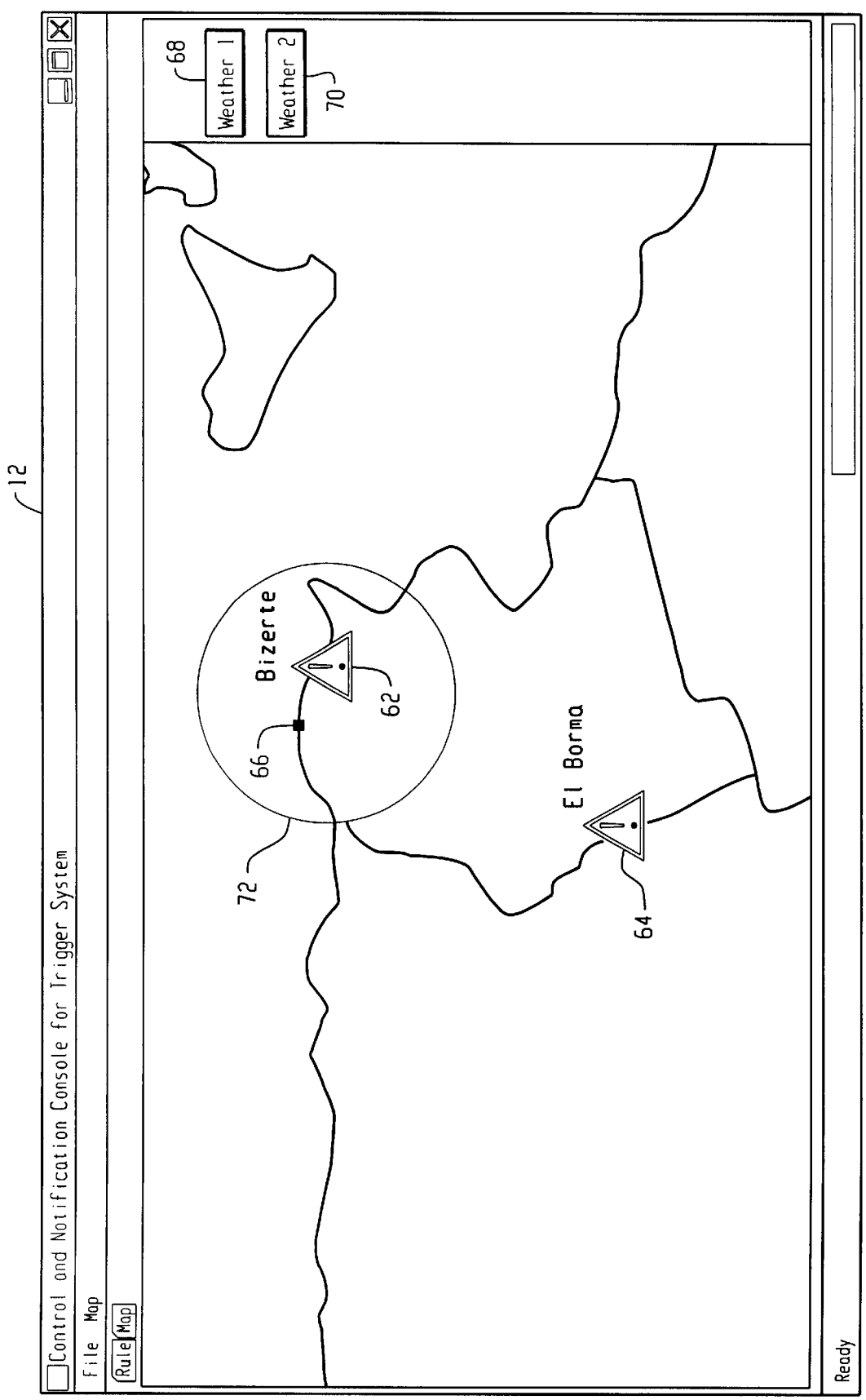
FIG. 5 is a diagram illustrating a Graphical User Interface (GUI) display of the present system.

Map Interface with Parameter Drag-and-Drop Specification of Weather Rules for Cosent FIG. 5 illustrates a map display of the GUI 12 for assigning rules to specific geographical locations. The "bad weather" trigger is installed at cities Bizerte and El Borma, as indicated by triangles 62 and 64. The weather report indicating bad weather at Banzart (near Bizerte) represented by a square 66.

To specify the location parameter, the map interface is presented to a high-level user. The applicable rules are displayed next to the map as indicated at 68 and 70. A rule is dragged to the desired position on the map using a mouse or other pointing device. A geographic range which satisfies, for example, a "near-to" condition can also be specified using the template 16 and displayed on the map as indicated by a circle 72. The circle represents a near-to condition as being within a predetermined distance from Bizerte.

Thus, a geographical parameter can be specified in a drag-and-drop fashion on the map display. The value specified will be graphically displayed on the map. For example, if a "bad weather" trigger is inserted near city 'Bizerte', a weather-warning icon will be displayed at 'Bizerte' on the map when a bad weather condition is detected.

After the parameters are assigned concrete values, the rule parser 32 and rule converter 34 will determine the range of values corresponding to weather condition 'WEATHER_CONDITION_X'and the area that is near to 'LOCATION_Y'. This will result in popping up another rule finalization interface for high-level users to explicitly choose the weather condition ranges and 'nearby' range. After all the uncertain aspects in a rule are specified, the rule is finally installed into the rule repository.

Figure 6:
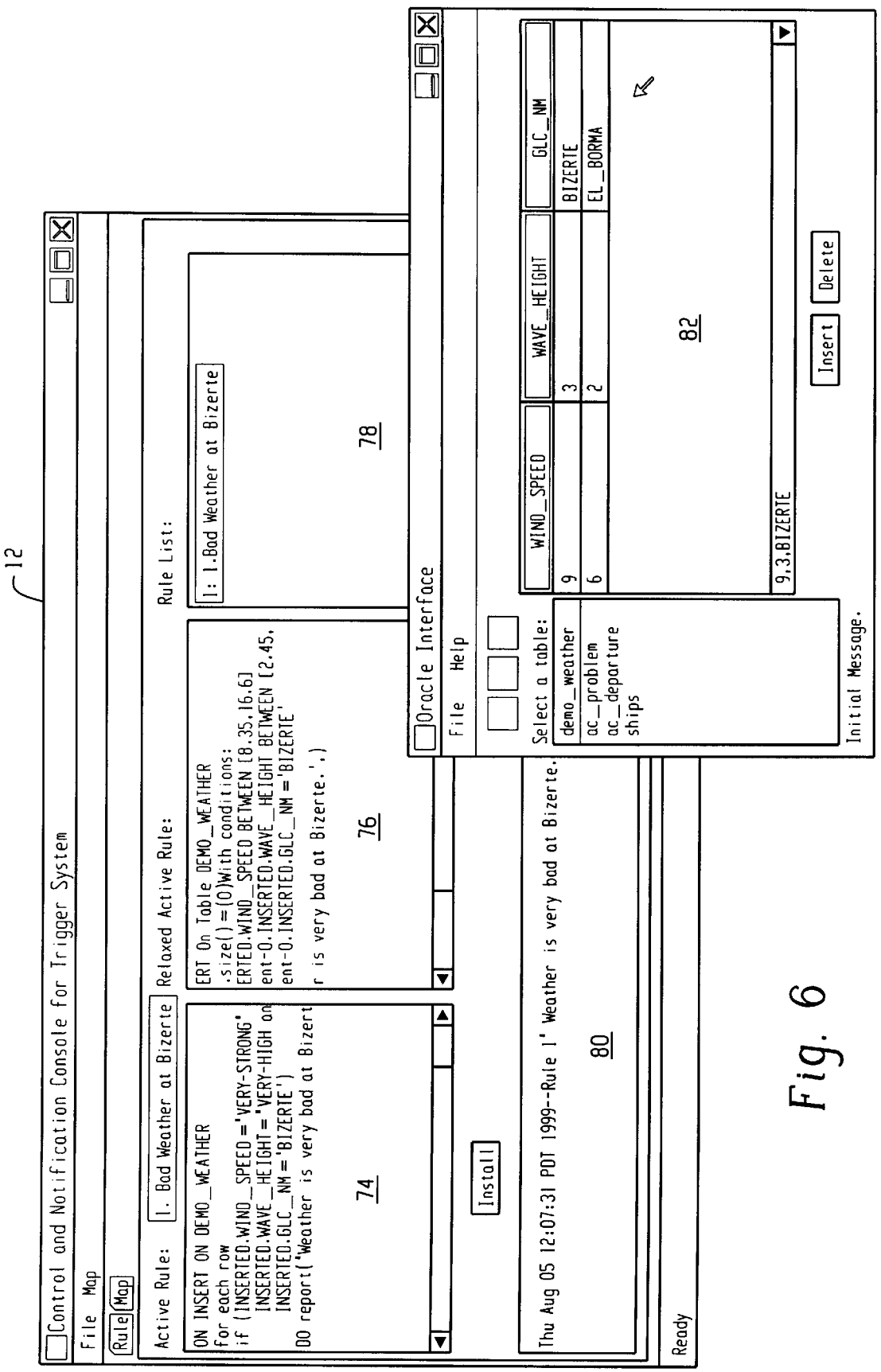
FIG. 6 is a view illustrating a rule finalization template GUI of the present system.

An exemplary rule finalization template of the GUI 12 is illustrated in FIG. 6. The display includes a number of panels. A panel 74 displays a high level rule in an English-like format. A panel 76 displays a relaxed active rule which has been relaxed by the rule converter 34. A panel 78 displays a list of rules. A panel 80 presents the rule action which provides "bad weather at Bizerte" notification to the commander, and a panel 82 displays the numerical values of the variables as generated by the database 22 or an LED.

Figure 7:
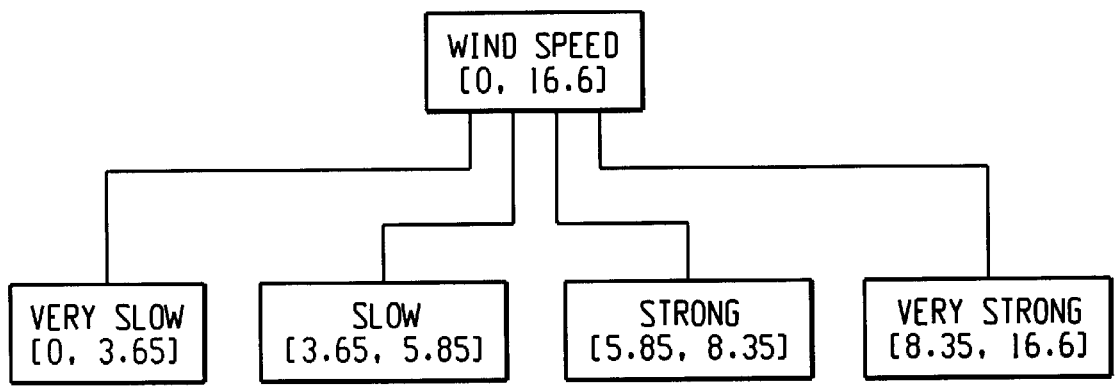
FIGS. 7 and 8 are views illustrating TAHs associated with the display of FIGS. 5 and 6.
Figure 8:
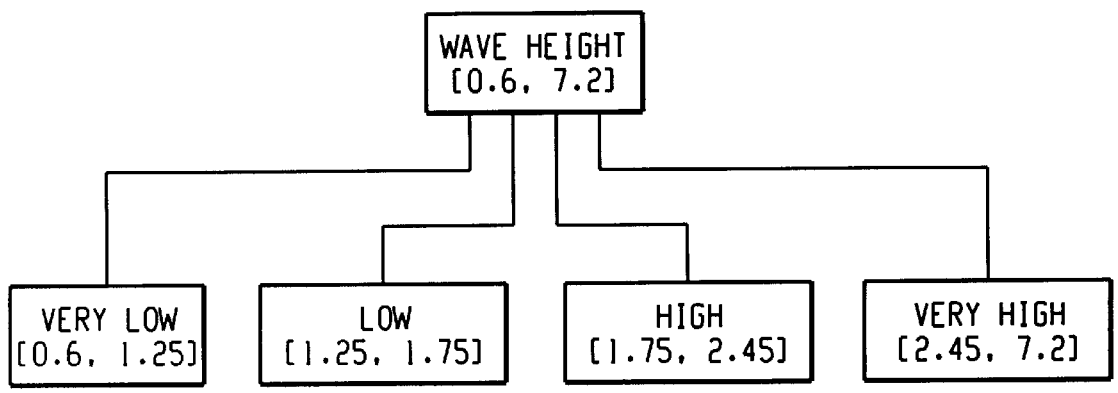

FIGS. 7 and 8 illustrate TAHs associated with the weather conditions (Rule R1') display of FIG. 6. The variables define bad weather as consisting of values of wind speed and wave height for nautical vessels. In FIG. 7, for example, a very high wind speed will be between 8.35 and 16.6 mph, whereas very high wave height will be between 2.45 and 7.2 ft.

In the panel 82, the wind speed=9 mph and wave height=3 ft. at Bizerte are both in the very high range, and these conditions will cause the event manager 28, in combination with the rule manager 24 and action manager 26, to generate an action, such as sending an e-mail to a commander. The weather conditions at El Borma, more specifically wind speed=6 mph and wave height=2 ft. are in the high range, rather than the very high range, and an action will not be generated.

Cosent Server Functionality

Figure 9:
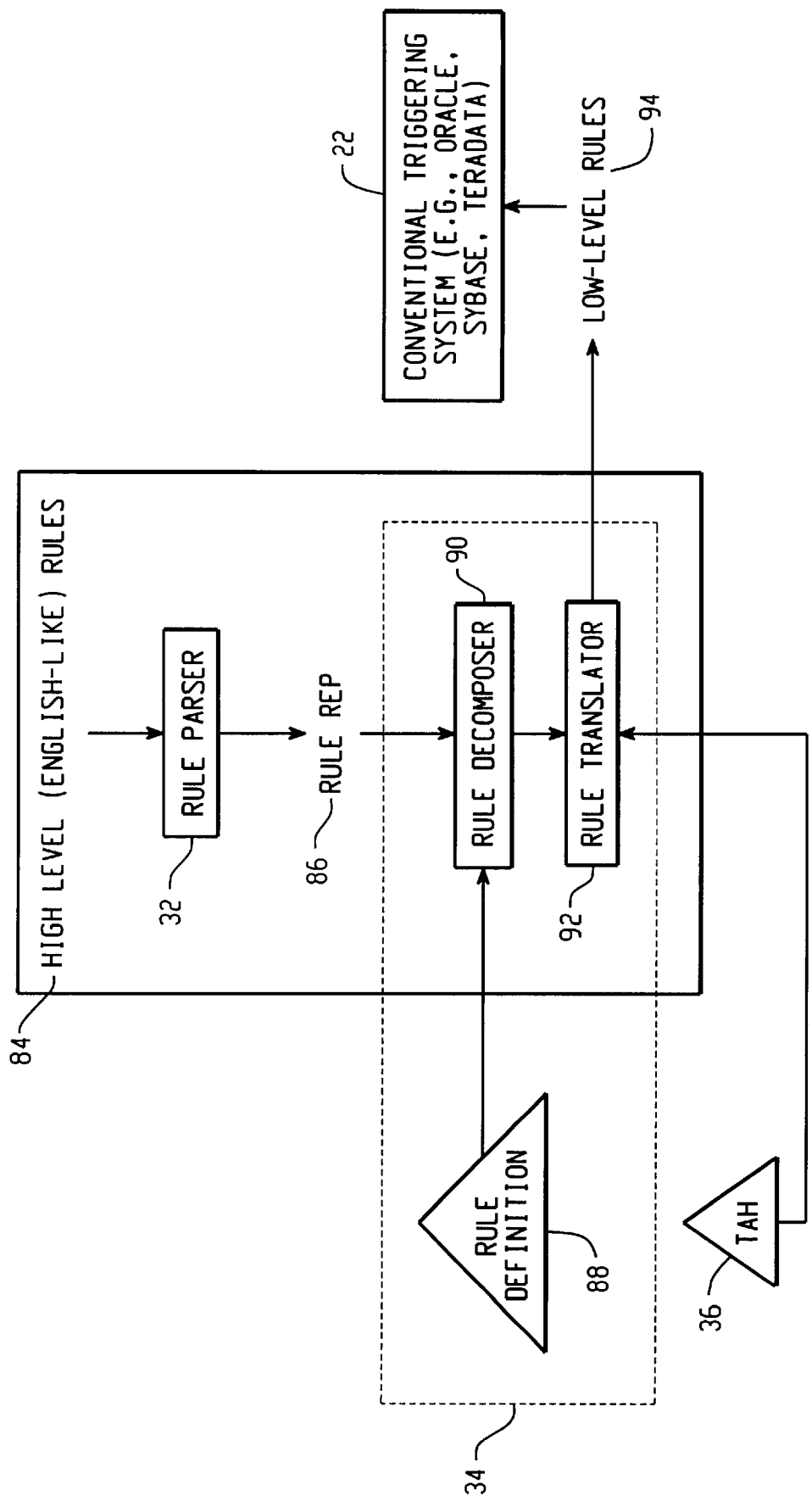
FIG. 9 is a diagram illustrating the functionality of the server of FIG. 2.

FIG. 9 is a diagram illustrating the functionality of the Cosent server 14, which comprises the rule parser 32, rule converter 34, rule manager 24, and event manager 28 as illustrated in FIG. 2. As viewed in FIG. 9, the rule parser 32 takes an English-like active rule 84 and generates an internal uniform representation of the rule, the (RuleRep) 86, which contains the conceptual terms and operators.

The rule converter 34 applies a rule definition 88 and the applicable TAHs 36 to decompose the rule and translate the cooperative operators in the RuleRep 86 into a set of exact conditions as indicated by functions, and generates a new RuleRep 94 without a cooperative operator (all cooperative operators are translated). It will be noted that the action manager 26 is also able to utilize the rule converter 34 and TAHs 36 to determine an action in accordance with a particular rule.

The rule manager 24 stores, schedules, decomposes, and installs the rules. The rule manager 24 stores all the Event-Condition-Action (ECA) information in a set of tables in the database 22 when it receives information from the rule parser 32. Upon start and recovery of the server 14, the rule manager 24 re-stores and creates all events and rules from these tables. The rule manager 24 installs the composite event specification in the event manager 28. The rule manager 24 can also trace the rule execution order for each transaction. The trace will be useful in rule termination and explanation of system behavior.

Although not illustrated in detail, the Event Manager 28 consists of an event composer and an event queue. The event composer constructs an event tree based on the event specification from the rule manager 24. The event composer maintains a set of event trees, and each tree represents a distinct composite event.

The event queue buffers the incoming simple events and informs the event composer. The incoming events are processed according to the event trees. The event composer evaluates the conditions and informs the rule manager 24 when a composite event occurs. CoSent supports the 'Recent' semantic for composite events. The CoSent Server 14 operates on top of commercial relational databases and links to the low-level trigger mechanisms of commercial database systems (e.g., Oracle, Sybase, etc.).

CoSent can be used in conjunction with commercial RDBMS (e.g., Oracle, SyBase, etc.). The trigger is activated based on database events. To extend CoSent to support a variety of platforms such as PDA, palm-top computers, sensors, etc., and to monitor distributed objects in addition to conventional database tables, the CoSent architecture can be expanded to a distributed and JAVA/JINI-based architecture as illustrated in FIG. 3.

In the distributed CoSent system, the distributed and heterogeneous event source interface comprises a local event detector (LED) as described above, which replaces the standard alerting mechanisms provided by distributed object interconnection middleware (e.g. JINI). After an event is generated by certain event source, the LED is notified to carry out certain local condition evaluation using user-submitted (or program-submitted) filter objects 18 and 59.

Whenever a condition is satisfied, the CoSent LED will invoke through distributed object interconnection middleware either distributed action objects 18 and 59 to finish corresponding actions, or to the CoSent Server 14 to further construct composite events. For distributed CoSent implementation, the JINI platform is a potential choice as the distributed object interconnection middleware 48, 50 and 52.

CoSent uses knowledge-based relaxation technology to translate English-like rules to low-level rules to cause trigger actions on commercial RDBMSs and significantly enhances the capability of commercial RDBMSs. CoSent also supports ODBC and JDBC and is transparent to end-users.

Distributed CoSent is capable of monitoring a set of distributed heterogeneous objects such as PDA, Palm computers, and Web documents by the LEDs via Information Middleware (e.g. JINI). To demonstrate the distributed CoSent capabilities, the weather and or other sensors can be monitored at several distributed sites. An exemplary rule can be: "If the aircraft has a fuel contamination problem and the aircraft type is similar-to a 'C-5' based on its fuel type and fueling method, then notify the commanders."

The local event detector is capable of detecting simple events via its local filter. The composite event will be detected via alerts sent from the LEDs from geographically distributed sites to the CoSent Server 14 for condition evaluation and triggering.

In summary, the present invention overcomes the limitations of the prior art and provides a database event detection and notification system which can process rules which include inexact and uncertain database trigger conditions that cannot be handled by the prior art. The system supports active rules with conceptual terms (e.g. heavy, large) and approximate operators (e.g. similar-to, near-by). The invention also supports distributed composite events. As a result, it is much easier for rule specification and maintenance.

CoSent layer architecture resulted in primitive event detection done at the database site, rule evaluation done at the CoSent Server, and the rule action execution evaluated at the Action Server. As a result, CoSent provides detached condition evaluation and detached action execution. Because of the separation of the CoSent Server from Action Server, rules with new action can be added without interfering event detection. Therefore CoSent rules can be constructed during run time even with new action specification.

Various modifications will become possible for those skilled in the art after receiving the teachings of the present disclosure without departing from the scope thereof.

What is claimed is:

1. An event detection and notification system, comprising:

a rule definer for defining a high level rule which can include a conceptual term;

a rule converter for converting the high level rule into a low level rule in which the conceptual term is quantified;

an event manager for detecting and evaluating an event;

a rule manager for applying low level rule to the event detected by the event manager; and an action manager for performing an action in accordance with the application of the rule by the rule manager;

wherein the rule converter stores and utilizes a Type Abstraction Hierarchy (TAH) for converting the high level rule into the low level rule.

2. A system as in claim 1, in which:

the rule comprises an attribute; and the TAH comprises leaves corresponding to instances of the attribute, and a hierarchical arrangement of nodes which specify ranges which include at least one of said instances respectively.

3. A system as in claim 2, in which the rule converter is configured to convert the high level rule into the low level rule by relaxing a value of the attribute in accordance with the TAH.

4. A system as in claim 1, in which the action manager utilizes the TAH for determining how to perform the action.

5. A system as in claim 4, in which:

the rule comprises an attribute; and the TAH comprises leaves corresponding to instances of the attribute, and a hierarchical arrangement of nodes which specify ranges which include at least one of said instances respectively.

6. A system as in claim 5, in which the action manager is configured to determine the action to be performed by relaxing a value of the attribute in accordance with the TAH.

7. A system as in claim 6, in which the database stores and utilizes the low level rule to determine whether or not to generate the event.

8. A system as in claim 1, in which:

the high level rule and the low level rule each comprise an event, a condition and an action; and the high level rule comprises conceptual and approximate terms to describe the events, conditions and actions.

9. A system as in claim 1, in which:

the event manager, rule manager and action manager function autonomously; and the rule definer and the rule manager are configured such that an rule can be modified during run time of the system.

10. A system as in claim 1, in which:

the event manager, rule manager and action manager function autonomously; and the rule definer and the rule manager are configured such that a new rule can be added during run time of the system.

* * * * *